W. H. COLBURN.
CABLE RAILWAY.
APPLICATION FILED DEC. 1, 1911.
1,044,496.
Patented Nov. 19, 1912.
3 SHEETS—SHEET 1.
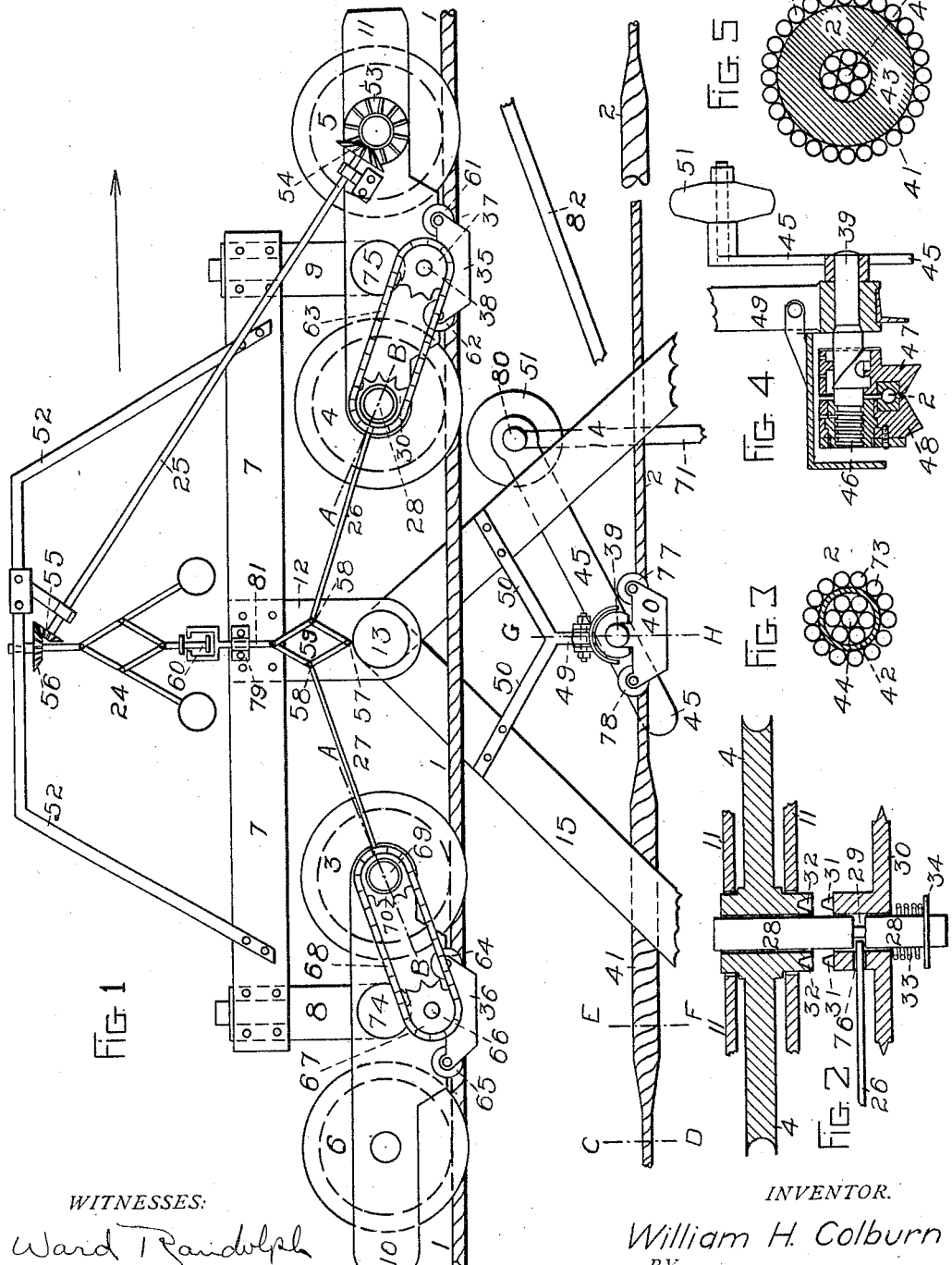
WITNESSES:
Ward T Randolph
Gertrude Herren
INVENTOR.
William H. Colburn
BY
John F. Mullaney
ATTORNEY.

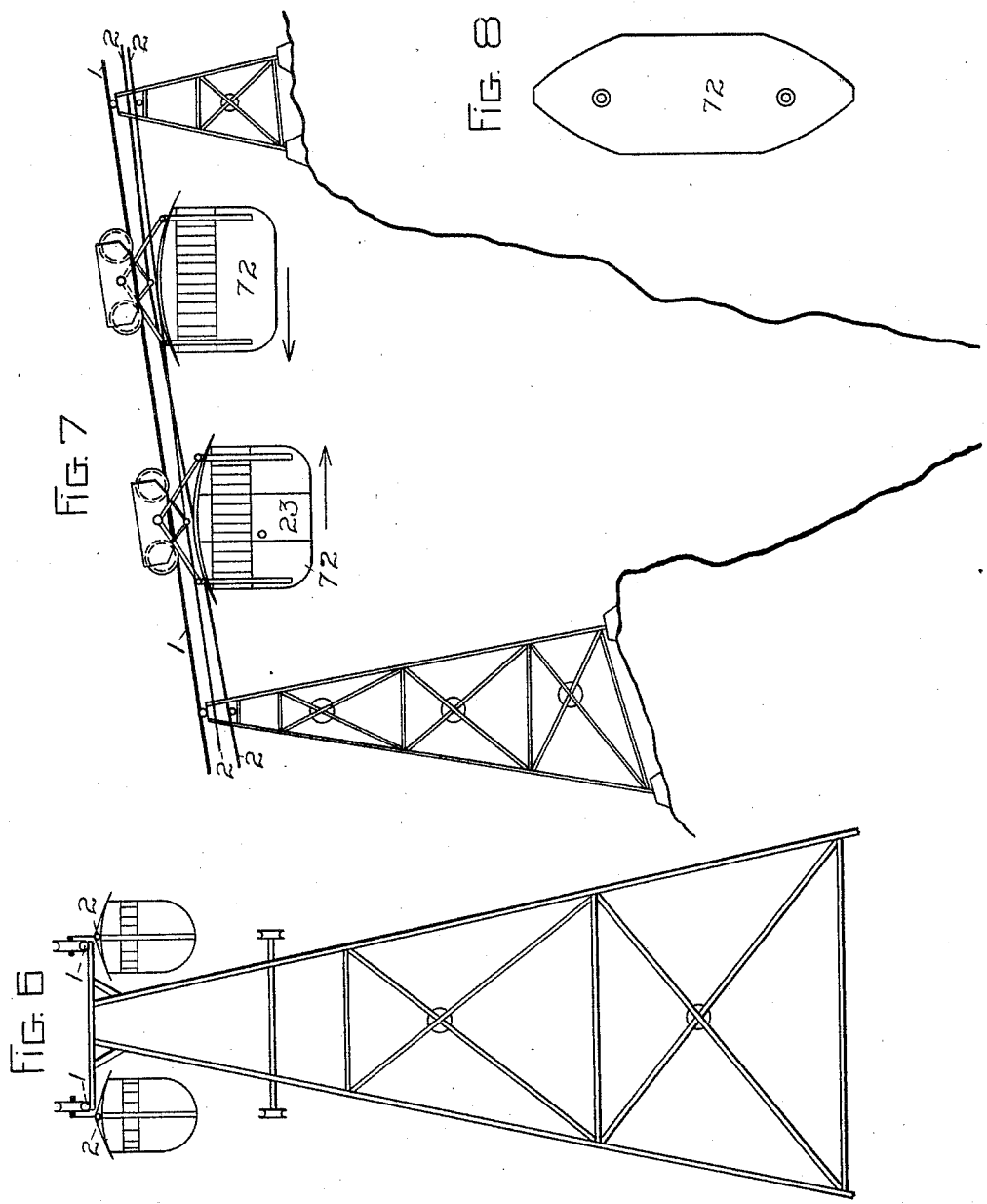

W. H. COLBURN.
CABLE RAILWAY.
APPLICATION FILED DEC. 1, 1911.
1,044,496.
Patented Nov. 19, 1912.
3 SHEETS—SHEET 3.
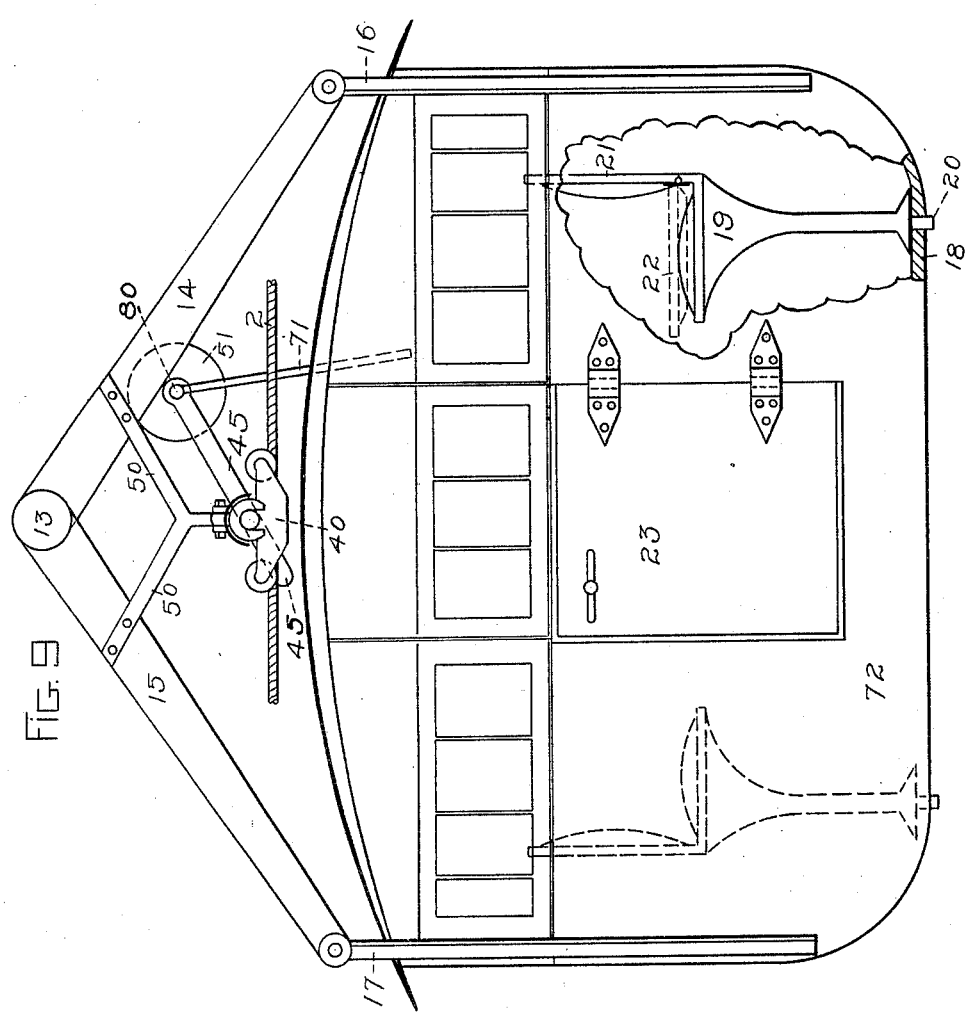
WITNESSES:
Ward Randolph
Gertrude Herren
INVENTOR.
William H. Colburn
BY
John F. Mullaney
ATTORNEY.

UNITED STATES PATENT OFFICE.

WILLIAM H. COLBURN, OF COLORADO SPRINGS, COLORADO.

CABLE-RAILWAY.

1,044,496.  Specification of Letters Patent.  Patented Nov. 19, 1912.

Application filed December 1, 1911. Serial No. 663,210.

*To all whom it may concern:*

Be it known that I, WILLIAM H. COLBURN, a citizen of the United States, residing at 9 South Weber street, Colorado Springs, in the county of El Paso and the State of Colorado, have invented new and useful Improvements in Cable-Railways, of which the following is a specification.

My invention relates to improvements in aerial tramways in which a carrying truck is made to support a car for transporting passengers or wares and is pivotally suspended so as to maintain, by gravitation, a level floor and being supported by a carrying truck having an automatic appliance for instantaneously locking it to the carrying cable in cases of emergency; and the objects of my improvements are, first, to provide a safe and comfortable car for passengers to be conveyed on a tramway; second, to provide means to have the car maintain a level floor and an even regular motion forward; third, to provide means for stopping the car without stopping the traction cable; fourth, to provide an automatic gripping appliance on the truck of the car that will lock itself to the carrying cable in case of an excessive speed being acquired by the car; fifth, to provide an enlargement in the traction cable to insure the gripping of the cable by the gripping appliance; sixth, to provide a detachable folding seat for passengers in a tramway car; seventh, to provide an automatic safety appliance to lock the car to the supporting cable and stop it in case the traction cable should become inefficient. I attain these objects by the mechanism illustrated in the accompanying drawings, in which—

Figure 1, is a side elevation of the truck resting upon the carrying cable 1, and showing the connection by friction grip with the traction cable 2. Fig. 2, is an enlarged section of wheel 3, and wheel 4, on the line A—B. Fig. 3, is an enlarged section of the traction cable on the line C—D. Fig. 4, is a detailed section of the friction grip 40, on the line G—H. Fig. 5, is an enlarged section of the traction cable 2, on the line E—F. Fig. 6, is a diagrammatic view of an end of the tramway showing two cars and a tower. Fig. 7, is a diagrammatic side view of the tramway showing two cars passing on opposite sides of two supporting towers. Fig. 8, is a diagrammatic top view showing the torpedo form of a car. Fig. 9, is a side elevation of a passenger car for the tramway.

Similar letters and similar numerals refer to similar parts throughout the several views.

The four wheeled tramway truck and the suspended passenger car form the framework to the principal parts of my invention.

The four wheeled carriage shown in Fig. 1, has the supporting beam 7, provided at either extremity with the upright pivot 8, supporting the rear end of the beam 7, and resting upon a pivotal bearing 74, in the rear truck frame 10, between the front wheel 3, and the rear wheel 6, of the rear truck. The front end of the supporting beam 7, is supported by the upright pivot 9, resting upon the pivotal bearing 75, in the front truck frame 11, between the rear wheel 4, and the front wheel 5, of the front truck. Intermediate the upright pivots 8, and 9, is the hanger bracket 12, rigidly secured to the supporting beam 7, and pendent therefrom and above the carrying cable 1. The front hanger arm 14, and the car hanger arm 15, of the passenger car 72, are pivotally connected at 13, with the hanger bracket 12, so that the supporting beam 7, may have either end raised or lowered upon the carrying cable 1, and yet the floor of the car 72, will maintain a level position by reason of gravitation from the hanger pivot 13. The front end frame 16, and the rear end frame 17, are rigidly built into the frame of the car 72, and firmly secured to the hangers 14, and 15, respectively.

Suspended securely and rigidly upon the bracket 50, 50, is the pendent attaching frame 49, carrying the friction grip 40, adapted to engage the traction cable 2. To the screw shaft 39, of the friction grip 40, is rigidly secured the double lever 45, adapted to operate it and cause the inner jaw 47, and the outer jaw 48, to grip the traction cable 2, when the top end of the double lever 45, is thrown forward to the right in the direction indicated by the arrow in Fig. 1, and is loosened and released from gripping traction cable 2, when the top end of double lever 45, is thrown in the opposite direction by the operation of the compressing thread 46, on the screw shaft 39, opening the jaws 47, and 48.

To obviate the possibility of the traction cable 2, slipping through the friction grip 40, for any reason undesired, I have provided an enlargement or swell 41, on the traction cable 2, by increasing the amount of the wrapped fiber filling 42, shown in Fig. 3, to a greater amount as shown and designated by 43, in Fig. 5, thus changing the size of the traction cable from that shown on the line C—D to that shown on the line E—F of Fig. 1.

In Fig. 9, 71, is a hand rod extending downwardly into the passenger car 72, and pivotally connected at its top end with the double lever 45, at 80, and is adapted to enable a person in the car 72, to release the friction grip 40, from the traction cable 2, and thus allow the car to stop while going up hill or at a station without stopping the traction cable or to allow the car to run backwardly down an incline on the carrying cable and to stop it from running backward by reconnecting the friction grip 40, with the traction cable 2.

To guard against accident such as defective machinery operating the traction cable or a breakage of the traction cable and to guard against a "runaway" of the car for any cause, I have provided two locking grips on each carriage adapted to lock the carriage at both ends to the carrying cable 1. The locking grip 35, is located between the wheels of the front truck and is operated and constructed similarly to the friction grip 40, above described; the screw sprocket wheel 37, taking the place of the double lever 45, and the screw shaft 38, taking the place of the screw shaft 39. Between the wheels of the rear truck is the locking grip 36, which is similar to the locking grip 35, and is adapted to be locked to the carrying cable 1, when the car is moving too rapidly in the direction indicated by the arrow in Fig. 1, while the locking grip 35, is intended to be locked when the car is going too fast in the opposite direction from that indicated by the arrow in Fig. 1.

In Fig. 2, is shown a clutch mechanism by which wheel 4, and wheel 30, may be rigidly locked together.

In the axle 28, is a deep annular groove 29, into which is inserted the front detention rod 26, after passing through the hole 76, in the hub of the clutch sprocket wheel 30, which detention rod prevents the clutch spring 33, from expanding.

Should the car and truck for any reason gain a greater speed than is desired, the accelerated motion of wheel 5, of the carrying cable 1, would cause an increased motion of the bevel gear wheel 53, which drives the bevel gear wheel 54, and the driving shaft 25, which drives the bevel gear wheels 55, and 56, operating the centrifugal governor 24, which would cause the loose swivel joint 60, to rise, thus drawing up the contracting arms 59, 59, thus bringing toward each other the pivotal connections 58, 58, thus withdrawing from their respective annular grooves 29, the front and rear extension rods 26, and 27, in Fig. 1, and as shown in Fig. 2, when 26, is withdrawn from 29, it will allow the clutch spring 33, which is compressed between the clutch sprocket wheel 30, and the clutch spring collar 34, rigidly secured to the axle 28, to expand and force the clutch sprocket wheel 30, against the rear wheel 4, of the front truck causing the clutch teeth 31, 31, on the inner edge of the hub of the clutch sprocket wheel 30, to be forced into the clutch recesses 32, 32, adapted to receive them in the edge of the hub of rear wheel 4. This will cause the rear wheel 4, to turn the clutch sprocket wheel 30, with it, thus operating the driving chain 63, which will turn the screw sprocket wheel 37, thus turning the screw shaft 38, upon which it is rigidly secured, which screw shaft 38, will lock the locking grip 35, upon the carrying cable 1, in the same manner that the turning of 39, would lock the jaws 47, and 48, on traction cable 2, as illustrated in Fig. 4.

The mechanism in the locking grip 35, and the locking grip 36, being substantially the same as in the friction grip 40, the shaft 38, and 66, bear the same relation to the grips 35, and 36, as the shaft 39, does to grip 40, in Fig. 1, and the screw sprocket wheels 37, and 67, bear the same relation to grips 35, and 36, as does the double lever 45, to the grip 40, in Fig. 1.

The locking grip 35, of the front truck is supported upon the carrying cable 1, by means of the small carrying wheels 61, and 62, while the locking grip 36, between the wheels of the rear truck is supported on the carrying cable 1, by the small carrying wheels 64, and 65, and the friction clutch 40, of the traction cable 2, is supported by the small front and rear carrying wheels 77, and 78, respectively on the traction cable 2.

The axle 69, is substantially the same as the axle 28, and bears the same relation to the rear detention rod 27, and the clutch sprocket wheel 70, that the axle 28, does to the front detention rod 26, and the clutch sprocket wheel 30.

The driving chain 68, is the same as the driving chain 63, and bears the same relation to the clutch sprocket wheel 70, and the sprocket wheel 67, that the driving chain 63, bears to the clutch sprocket wheel 30, and the sprocket wheel 37.

The passenger car 72, Fig. 9, is suspended on the frames 16, and 17, and the arms 14, and 15, from the hanger pivot 13, which allows it to maintain its upright position and level floor 18. It is provided with a plurality of folding back seats 19, having each a foot tenon 20, adapted to fit into a hole or holes provided in the floor of the car. In Fig. 9, the folding back to the seat 19, is shown up in position for use, while in the same cut the dotted lines 22, show the back folded down upon the seat. In the same figure the car door 23, is shown closed.

To insure the gripping of the friction grip 40, upon the traction cable 2, I have enlarged the traction cable as shown at 41, by increasing the amount of the wrapped fiber filling 42, in Fig. 3, surrounding the center core cable 44, as shown by the wrapped fiber filling 43, in Fig. 5, which is an exaggerated section on the line E—F of Fig. 1. The center core 44, of the traction cable is wrapped throughout its entire length with a suitable fiber 42, of yielding material to allow the outer wire 73, to yield under pressure of the friction clutch 40, and to prevent wear. The enlargement 41, is intended to be used at great intervals only upon the traction cable 2.

The two lower contracting arms 59, 59, are secured to the hanger bracket 12, at their lower ends by the fixed pivot 57. The upright part or lower slide 81, of the centrifugal governor 24, is secured to the hanger bracket 12, by the swivel slide guide 79. The top of the centrifugal governor 24, and its driving mechanism 55, and 56, are attached to the supporting frame 52, mounted above the truck in Fig. 1.

At way stations and at the termini of the tramway line and other regular stopping stations the friction clutch 40, will be disengaged automatically from the traction cable 2, by reason of the trip roller 51, riding up over an incline 82, provided therefor thus allowing the car 72, to stop without stopping the traction cable 2.

In Fig. 8, is a diagrammatic top view of one of the passenger trams 72, showing the wedge shaped form of the front and rear construction which is intended to be advantageous in avoiding resistance from air currents and avoiding vegetation or other obstructions and for presenting a gliding surface in case of collision between two of the cars.

Among other objects for the wrapped fiber filling 42, is to provide a yielding material between the outer wires 73, and the wires of the core 44, so as to facilitate the yielding of the outer wires 73, in passing through the friction grip and also to prevent wear on the wires of the center core 44.

I am aware that prior to my invention tramways have been used for conveying ores down grade and that automatic release clutches have been used on transmission cables only in such tramway conveyances; I therefore do not claim tramways and tramway clutches broadly.

I claim:

1. In a traction railway, a passenger car adapted by gravitation to maintain a level floor, a carrying cable used as a track for carrying grooved wheeled trucks, having said car suspended from one of the trucks, a traction cable to convey said car, a clamping friction grip having two jaws rigidly secured to the frame of said car, and inclosing said traction cable and means for closing said grip upon said traction cable by an operator in said car, by a threaded screw shaft passing through said jaws and having threaded communication therewith, said shaft being turned by a lever operated by a connecting rod extending down into said car and convenient to be grasped by the hand of a person in said car, substantially as set forth and for the purposes specified.

2. In a traction railway, the combination of a passenger car adapted by gravitation to maintain a level floor, and being suspended from a transverse pivot, a carrying cable used as a track for carrying grooved wheeled trucks, to support said car and having said car suspended from one of the trucks, a traction cable to convey said car, a clamping friction grip having two jaws rigidly secured to the frame of said car, and inclosing said traction cable and means for closing said grip upon said traction cable by an operator in said car, by a threaded screw shaft passing through said jaws and having threaded communication therewith, said shaft being turned by a lever operated by a connecting rod extending down into said car and convenient to be grasped by the hand of a person in said car, substantially as set forth and for the purposes specified.

WILLIAM H. COLBURN.

Witnesses:
  C. C. MILES,
  GERTRUDE HERREN.

Copies of this patent may be obtained for five cents each, by addressing the "Commissioner of Patents, Washington, D. C."